United States Patent [19]

Claesson

[11] Patent Number: 5,147,420
[45] Date of Patent: Sep. 15, 1992

[54] METHOD AND APPARATUS FOR DRYING AIR

[75] Inventor: Knut Claesson, Stocksund, Sweden
[73] Assignee: Corroventa AB, Sweden
[21] Appl. No.: 678,347
[22] PCT Filed: Nov. 17, 1989
[86] PCT No.: PCT/SE89/00667
    § 371 Date: Apr. 26, 1991
    § 102(e) Date: Apr. 26, 1991
[87] PCT Pub. No.: WO90/06165
    PCT Pub. Date: Jun. 14, 1990

[30] Foreign Application Priority Data

Nov. 25, 1988 [SE] Sweden .................. 8804281

[51] Int. Cl.$^5$ .................................. B01D 53/08
[52] U.S. Cl. .......................... 55/34; 55/208; 55/390
[58] Field of Search ............... 55/34, 390, 208

[56] References Cited

U.S. PATENT DOCUMENTS

| | | | |
|---|---|---|---|
| 3,176,446 | 4/1965 | Siggelin | 55/34 |
| 3,251,402 | 5/1966 | Glav | 55/34 |
| 4,529,420 | 7/1985 | Norbark | 55/390 |

FOREIGN PATENT DOCUMENTS 28936 2/1982 Japan .................. 55/34

Primary Examiner—Bernard Nozick
Attorney, Agent, or Firm—Sughrue, Mion, Zinn, Macpeak & Seas

[57] ABSTRACT

There is described a method of drying air with the aid of a rotor (6) which rotates continuously in a housing (2) and which incorporates moisture-sorbent means. The housing (2) has mounted therein a casing (12) which is located on the low-pressure side of the rotor and provided with heat-emitting devices, for instance electrical elements (15), for delivering radiant heat directly to the rotor interior. The heat required for regeneration is therewith delivered at high temperature, which increases the heat yield. The part of the rotor (7) which is normally the most difficult to regenerate is therewith heated to a temperature of 250°–300° C. Since the volume of regeneration air is smaller than normal, the air is heated to a temperature which is much higher than normal in all parts of the rotor, so as to result in effective removal of the moisture present. The invention also relates to an air dryer by means of which the method can be put into effect.

12 Claims, 3 Drawing Sheets ial field

METHOD AND APPARATUS FOR DRYING AIR

TECHNICAL FIELD

The present invention relates to a method of drying air with the aid of a preferably continuously rotating rotor which is mounted in a housing provided with an inlet. Air which is pressurized by means of a fan passes through a rotor part, in which moisture present in the air is extracted therefrom by a moisture-sorbent located in the rotor part. Hot air is conducted through another part of the rotor such as to regenerate, the rotor part while taking-up moisture and is discharged from the housing. The air treated in the rotor departs through the rotor outlet.

The invention also relates to an air-dryer or dehumidifier, and more particularly, but not exclusively, to an air-dryer including a housing provided with an inlet and outlet, a rotor which is journaled in the housing and which incorporates passages or a bed which contains a moisture-sorbent (e.g., silica-gel crystals), a means for driving the rotor, a fan for pressurizing air supplied to the inlet, such that the air will flow through at least one part of the rotor and, subsequent to moisture-extraction, will depart through the outlet, means for heating the regeneration air passing through a further part of the rotor, and heat-emitting devices mounted adjacent the rotor on its low-pressure side and which are operative to deliver radiant heat axially onto the moisture-sorbent disposed in the rotor passages or bed.

BACKGROUND PRIOR ART

Known air-dryers of the kind which operate in accordance with the above, in which the rotor normally rotates at a speed of about 25 rev./h, do not effectively utilize the supplied energy and therefore incur high operation costs. Such air-dryers are also large and heavy, and therefore expensive.

The air-dryers are also relatively complicated structurally, and consequently are expensive as a whole and difficult to dismantle, for instance for servicing and maintenance purposes.

Present-day air-drying or dehumidifying systems are also constructed from materials which render the useful life of such systems unsatisfactory.

The unsatisfactory efficiency of present-day air drying apparatus is due, inter alia, to the fact that the regenerating battery is located at some considerable distance from the rotor. The regeneration air—which normally has a temperature of 110°-120° C.—is therefore incapable of extracting moisture effectively, particularly moisture which is captured in the nooks and crannies of those rotor-parts which are located in the region of the low-pressure side of the rotor, where the moisture is most difficult to extract.

Also known to the art are air-dryers or dehumidifiers of the kind which include a moisture-adsorbing rotor provided with drive means, two fans driven by a common motor, of which one fan is intended for process air and the other fan intended for regeneration air, and filters for filtering the two air-flows.

This known drying apparatus is divided into five sections, placed one above the other. The requisite electrical equipment is housed in the lid or cover of the dryer, together with the rotor drive-motor The two fans, the motor which is common to the fans, and the filters are housed in the second and third sections respectively. The next lowest section houses a distribution chamber operative to distribute process-air and regeneration-air, together with a heating battery. The actual rotor itself is housed in the bottom section, with the rotor in a horizontal, i.e. with a vertical axis. Subsequent to regenerating the rotor in the lowermost section of the dryer, the wet air and the dry air are led away from said section in mutually different directions.

This apparatus is also ineffective, since that part of the rotor where the moisture is captured most effectively, i.e. is the most difficult to extract, is not regenerated at a sufficiently high level of temperature.

Other examples of the present state of this art are to be found in GB-A-2165465 (Munter Rotair) and SE-B-429301 (Munters).

OBJECT OF THE PRESENT INVENTION

The object of the present invention is to eliminate the aforesaid drawbacks of the conventional known air-drying methods and apparatus, and to improve the heat-yield of the process by recovering and utilizing the energy delivered to the regenerating air in a more effective manner.

SUMMARY OF THE INVENTION

This and other objects are fulfilled by a method of the aforesaid kind which is mainly characterized by bringing the regeneration air into the close proximity of heat-emitting devices which are placed on the low-pressure side of the rotor and which are operative to deliver radiant heat axially and directly onto moisture-adsorbing means or moisture-absorbing means located in the rotor interior.

By mounting the heat-emitting devices in close proximity with the rotor, the heat required to regenerate the rotor can be given a high temperature, which therewith increases the heat-yield in, inter alia, the rotor passageways, i.e. eliminates heat losses.

Furthermore, by utilizing radiant heat to regenerate the rotor, that part of the rotor which is normally most difficult to regenerate will be heated satisfactorily.

In accordance with one preferred embodiment of the invention, heat stored in the rotor is used to preheat a captured air-volume, which is deflected and constitutes regeneration air. Thus, preheated air enters a regeneration battery which covers a given part of the rotor. The regeneration battery is primarily operative to radiate thermal energy directly into the rotor interior. This purely radiation-heat provides the highest yield; the captured and deflected, preheated air-flow, which is further heated during its passage through the casing, is also required, however, to transport away moisture from parts of the rotor which are located nearer the high-pressure side of the rotor and which are therefore not reached by radiant heat from the regeneration battery equally as effectively.

In combination, the radiant heat of high energy-level is delivered to the rotor where the greatest difficulties exist in removing moisture taken-up by the sorbent, while energy of a lower level is utilized where removal of the water is more simple.

Thus, the inventive method enables the energy available to be utilized more rationally, and therewith increases the efficiency of the drying air process.

In practice, it is preferred that the air preheated during its passage through the rotor is deflected by the casing and heated by the heat-emitting devices to a temperature which, together with the radiated heat, Will bring the rotor-material situated adjacent the casing to a temperature higher than 200° C., preferably above 250° C.

This will ensure that the thermal energy delivered will be used optimally.

It is also preferred that 15–35%, preferably about 20%, of the air pressurized by the fan and passing through the rotor is captured by the casing and utilized as regeneration air.

Trials have shown that the highest efficiency afforded by the inventive method is achieved when about 1/5th–1/6th of the pressurized air is recycled through the rotor as regeneration air. Since this volume of air is smaller than normal, the regeneration air will have a higher temperature in all parts of the rotor and is therefore able to remove moisture in a more effective manner than known constructions of this kind.

The rotors of conventional air-drying apparatus normally rotate at a speed of from 10 to 12 revolutions per hour (rph). Because the present invention enables the thermal energy delivered to be recovered more efficiently, it has been found possible in practice to increase the rotor speed in relation to what has previously been considered an optimum speed, thereby further improving the efficiency of the apparatus and also enabling the apparatus to be of lighter, and therewith less expensive construction.

When practicing the method according to the present invention, the rotor speed will preferably lie within the range of 15–30 rph, wherein a rotor speed of about 25 rph has been found to provide the best result.

In practice, it is also preferred that the regeneration air recycled through the rotor is captured by a further casing located opposite the first mentioned casing on the pressure-side of the rotor, from which the wet regeneration air is discharged from the housing, for instance through a discharge conduit.

As before mentioned, the invention also relates to an air-drying apparatus. This apparatus is mainly characterized by an air dryer including a housing provided with an inlet and an outlet, a rotor which is journaled in the housing and which incorporates passages or a bed which contains a moisture-sorbent (e.g., silica-gel crystals), a means for driving the rotor, a fan for pressurizing air supplied to the inlet, such that the air will flow through at least one part of the rotor and, subsequent to moisture-extraction, will depart through the outlet, means for heating the regeneration air passing through a further part of the rotor, and heat-emitting devices mounted adjacent the rotor on its low-pressure side and which are operative to deliver radiant heat axially onto the moisture-sorbent disposed in the rotor passages or bed.

An air-dryer constructed in accordance with the invention will demoisturize air dynamically, in a continuous process, such as to enable a constant moisture-climate to be achieved.

Various drying agents can be used to dry the air, for instance absorbent or adsorbent agents. Hygroscopic salt, e.g. lithium chloride, is an example of a suitable absorbent in this context. The molecular structure of the drying agent changes as it takes-up moisture. In the case of large quantities of moisture, some drying agents or desiccants may be converted to a liquid form. A drying agent of this nature is used to impregnate the rotor of a rotary dehumidifier or air-dryer.

Sorbent drying agents include materials which do not change physically or chemically when taking-up moisture. Aluminium oxide is an example of one material which belongs to this category and which is used at high pH-values and high relative humidity.

Molecular sieves form a category of substances which are highly effective in the present context, particularly when wishing to achieve extremely low air moisture contents. Molecular sieves, however, require high energy input and high regeneration temperatures, and consequently the method proposed in accordance with the invention is particularly suitable in this regard.

Silica-gel is a crystalline substance capable of taking-up large quantities of moisture, e.g. quantities coresponding about 40% of its own weight. Various types of silica gel are available, for different areas of use.

The last mentioned sorption agents or agents closely related thereto, i.e. silica gel or a molecular sieve, are used when practicing the present invention. It will be understood, however, that the invention can be applied with all available types of desiccants.

The invention can also be practiced with various types of rotors. A preferred rotor is one which includes a large number of passages capable of accommodating a moisture-sorbent, e.g. silica gel. This agent may also consist of a desiccant bed.

The casing which captures and deflects part of the dehumidified air in the rotor, and which therewith accommodates the heat-emitting devices, is preferably made of a highly reflective material, such as to reflect back radiation which is directed away from the rotor. Aluminium or an appropriate alloy thereof is a suitable casing material in this respect.

Other materials may also be used, however, and the casing may comprise a relatively inexpensive metal or plastics material provided with a reflective coating.

The invention will now be described in more detail with reference to an exemplifying embodiment thereof illustrated in the accompany schematic drawings.

DESCRIPTION OF PREFERRED EMBODIMENTS

Figure 1:
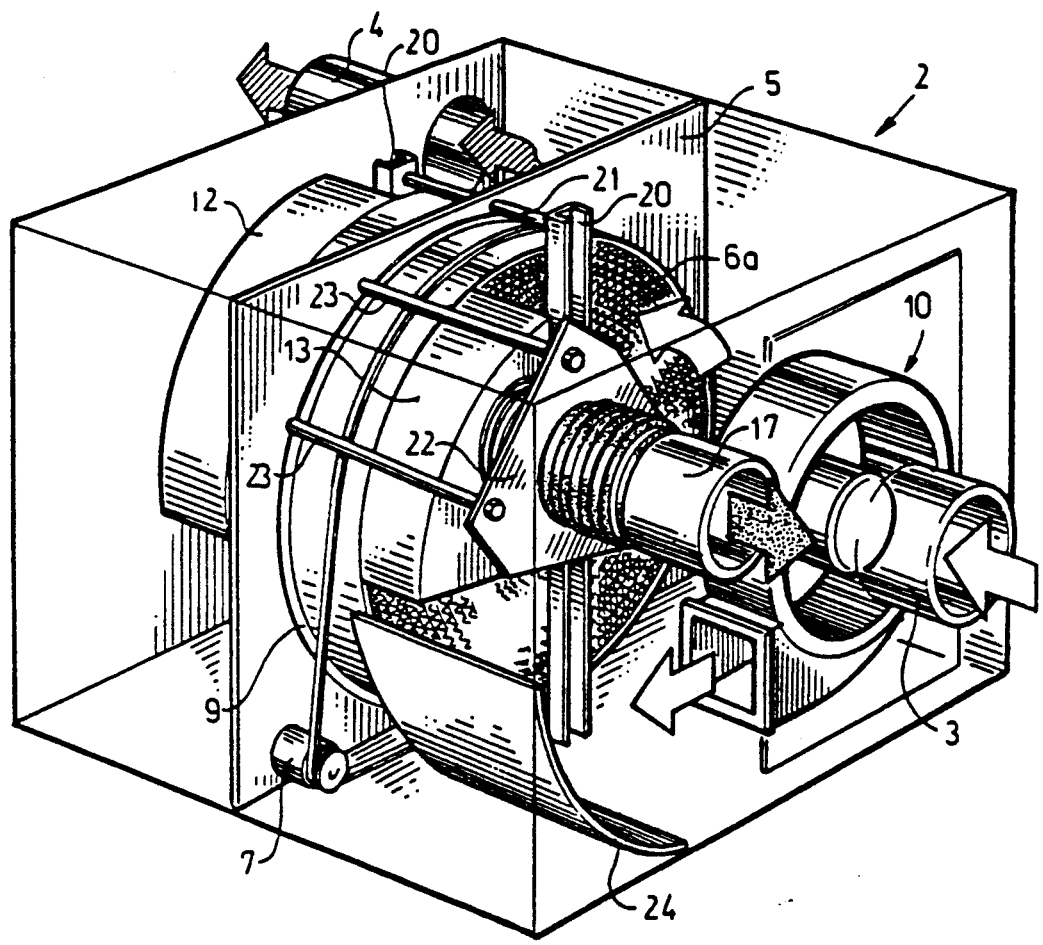
FIG. 1 is a perspective view of an air-dryer or dehumidifier constructed in accordance with the invention, the housing of the air-dryer being assumed to be transparent for the sake of illustration, so as to enable the various components of the air-dryer to be shown.
Figure 2:
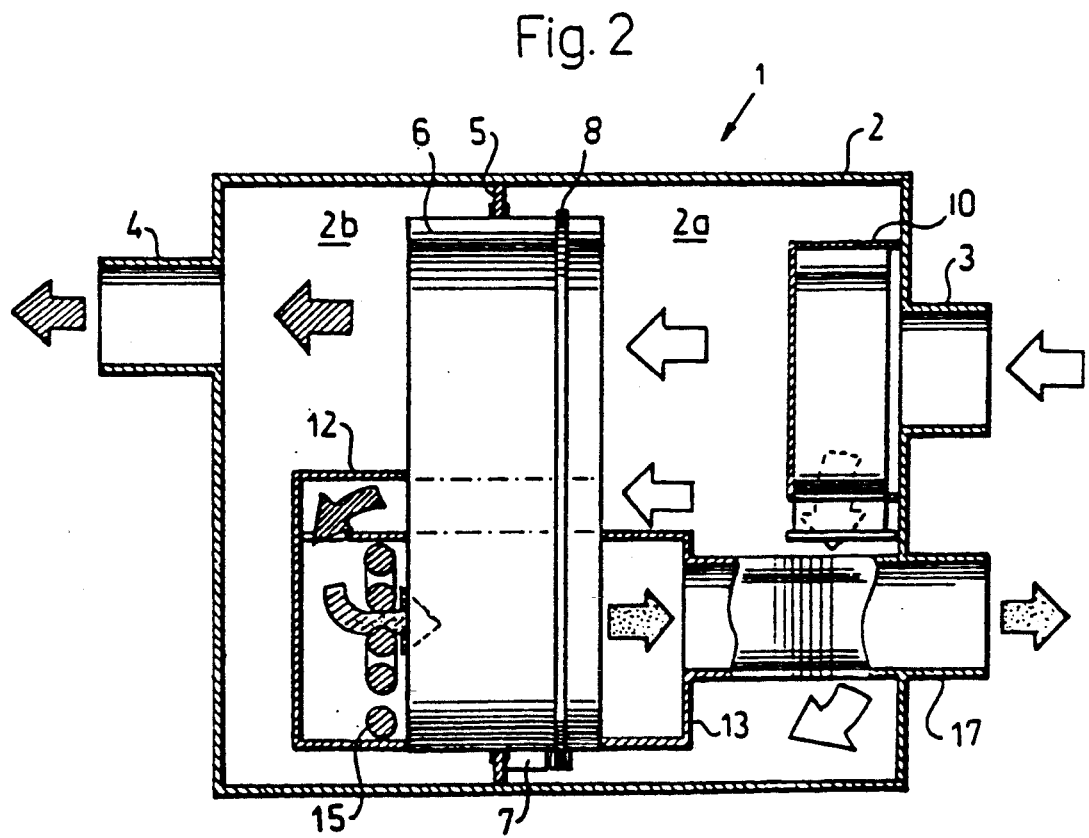
FIG. 2 is a vertical section through an air-dryer according to FIG. 1.

With reference to FIGS. 1 and 2, an air dryer 1 includes a housing 2 provided with an inlet 3 and an outlet 4.

Mounted in the housing 2 is a partition wall 5. The partition wall has provided therein a circular hole which accommodates a rotor 6, the journals of which are not shown in the drawings. The rotor is driven by an electric motor 7, via a belt 8, and is provided with a suitable seal 9 which seals the rotor against the partition 5.

The rotor 6 incorporates a large number of passages 6a, in which drying agent, for instance silica gel, a molecular sieve or the like is accommodated, therewith permitting practically unlimited regeneration of the rotor to be effected.

Located adjacent the inlet 3 is a centrifugal fan 10 which is operative to draw moist air into the inlet 3. The fan functions to create an overpressure in that part 2a of the housing which is located adjacent the partitioning wall 5. The air drawn-in and pressurized by the fan 10 will pass through the rotor 6 and is dehumidified and preheated therein. The major part of this air-flow enters a chamber 2b located on the other side of the partitioning wall and departs through the outlet 4, and is subsequently used for a useful purpose, for instance dry-air storage or for material-drying purposes in connection with some other process.

A minor part of the air passing through the rotor 6, e.g. one-fifth of the incoming air-flow, is captured by a casing 12, which is made of aluminium or some like material and mounted closely adjacent to the rotor 6 on the low-pressure side thereof The casing 12 has approximately the shape of the sector of a circle, with the exception of a part corresponding to the rotor shaft.

The casing 12 is divided into two chambers 12b and 12c by means of a dividing wall 12a. A further, similar casing 13 corresponding to the chamber 12c is located on the high-pressure side of the rotor, closely adjacent to the rotor and is sealed there against in the housing part 2a.

As mentioned, part of the air which flows through the rotor is captured by the casing part 12b. This captured air is deflected through 90° and passes into the chamber 12c, through an opening in the wall 12a. Heat-emitting devices in the form of electrical elements 15 are mounted in the chamber 12c.

The electrical elements 15 are mounted closely adjacent the rotor 6 and are intended to deliver strong radiant-heat to parts of the rotor lying close to the casing 12. The drive arrangements 7, 8 are intended to drive the rotor counterclockwise in the housing 2.

In addition to regeneration of the sorbent-substance by the heated air-flow deflected by the casing 12 and recycled through the rotor, the sorption agent is also regenerated by the radiant heat delivered by the heat-emitting electrical elements 15.

Thus, high-temperature thermal energy will radiate directly into the rotor, wherein those rotor-parts which lie adjacent the casing will be heated to a temperature above 250° C., possibly above 300° C.

That part of the rotor 6 where moisture is most difficult to reach and therefore most difficult to extract will thus undergo the most effective regeneration, mainly due to the radiant energy delivered by the electrical elements 15.

The air-flow which is preheated during its passage through the rotor and deflected and recycled therethrough, subsequent to being heated by the electrical elements 15, is also necessary for regeneration purposes, however This air-flow thus regenerates effectively primarily those parts of the rotor which are located close to its high-pressure side, and which are therewith not so difficult to extract as the rotor parts located adjacent the casing 12 and where the radiant heat from the electrical elements 15 has only a limited effect.

Figure 5:
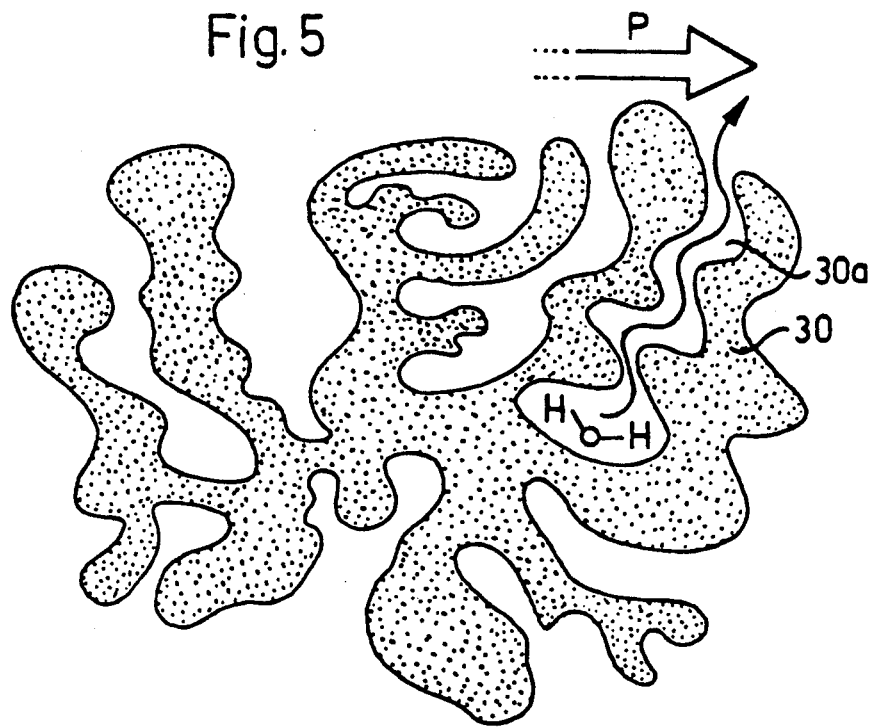
FIG. 5 is a schematic and greatly enlarged view of a silica-gel crystal and illustrates theoretically the events taking place when regenerating the crystal and thus also the rotor.

FIG. 5 is a schematic, greatly enlarged view of a silica-gel crystal, and shows the principle configuration of such a crystal and indicates in principle the events that occur when water is regenerated from a crystal desiccant. The crystal is designated by reference numeral 30.

As illustrated in FIG. 5, the crystal has a large number of passages 30a, and a single gram of crystal of the aforesaid kind can present a specific surface area of about 500 m$^2$. The figure also illustrates a water molecule H—O—H located in one such passage, while the arrow P indicates the passage of air through the crystal.

The figure gives an indication that the higher the temperature the higher the driving-force by means of which water is removed from the crystal during regeneration and the easier it then becomes to take-up water in the drying process.

An understanding of this mechanism will provide a theoretical explanation of the advantages afforded by the invention.

The moist regeneration-air is collected in the casing 13 and discharged from the housing 2 through a hose 17.

A support structure for supporting the rotor-journals is mounted in the partition wall 5 and includes, inter alia, vertical U-bars 20, one on each side of the wall 5, bolts 21, a plate 22 which carries the rotor journals (not shown), and bolts 23 which secure the plate 22.

The air-flow generated by the fan 10 is deflected by a curved plate 24.

In the case of the illustrated embodiment, the housing 2 may measure 0.4 m × 0.4 m × 0.4 m and the rotor may be rotated at a speed of 25 rph.

In air-dryers of this kind, the volume of dry air exiting through the outlet 4 may be in the order of 200 m$^3$/hour. In the present case, approximately one-fourth of this air volume, or more, is captured by the casing 12 and recycled through the rotor 2 for use as regeneration air.

Trials have shown that when the rotor speed is increased from 10 to 25 rev./hour, the capacity of the air dryer will also increase by about 20%, all other things being equal. Further increase in the rotor speed, however, will result in reduced capacity.

Consequently, the rotor speed should lie within the range of 15-30 rev./hour and preferably about 25 rev./hour.

An excessive decrease in the volume of regeneration air will result in a decrease in the efficiency of the air dryer, since because the radiant-energy effect cannot be properly utilized, the moisture cannot be carried away effectively. The invention, however, enables smaller quantities of air to be used, and therewith higher temperature levels, resulting in effective regeneration.

Practical trials have showns that in the case of a dryer of the aforesaid capacity value, i.e. a dryer which will produce 200 m$^3$ dry air per hour, the optimal power consumption is 1.6 to 1.7 kW. In the case of a dryer of this optimum construction, the rotor speed should be 25 rev./hour and the volume of air used for regeneration should be 40 m$^3$/hour.

An air dryer which operates on the basis of these values will provide the greatest possible regeneration effect per unit of energy input.

The aforesaid values apply with a rotor depth of 100 mm. Although a greater rotor depth, e.g. a rotor depth of 200 mm, will increase the capacity of the dryer by about 10%, the dryer in general will have larger dimensions and will be much more expensive to manufacture.

It has been found in practice that a rotor depth of 100 mm is appropriate for air dryers which deliver up to 600 m$^3$ of dry air per hour. A rotor depth of 200 mm is appropriate for dry-air volumes above this level.

The afore-mentioned values shall be considered as guides capable of illustrating variations contingent on other parameters applied with the dryer.

Figure 3:
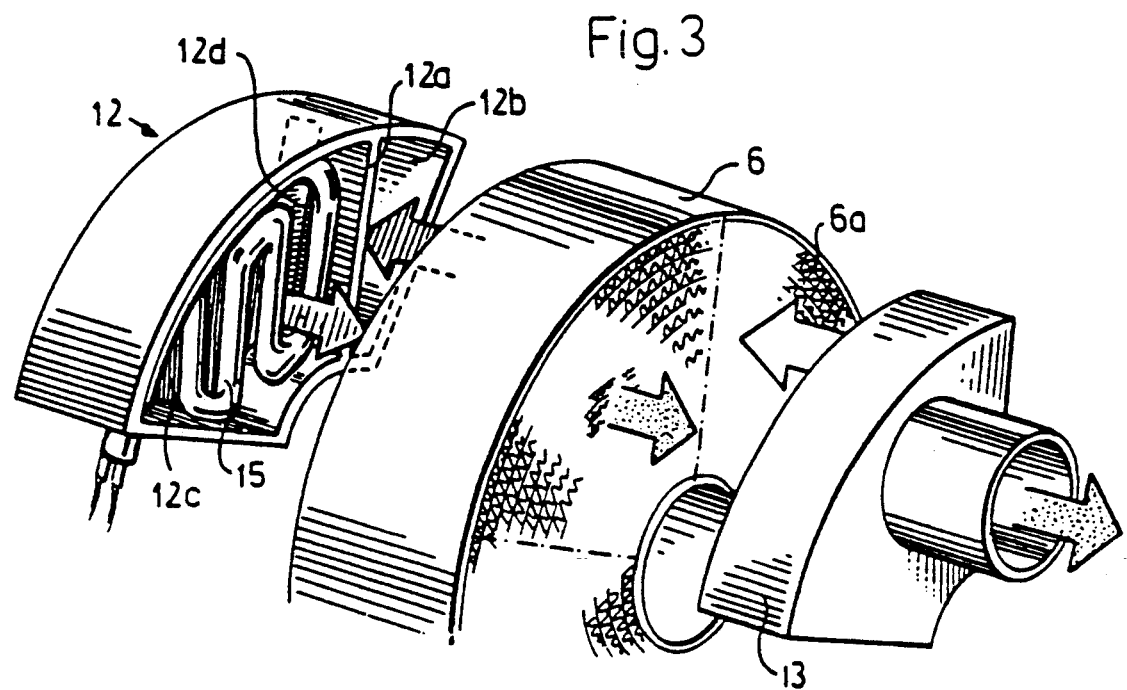
FIG. 3 is an exploded, perspective view of part of the rotor and illustrates casings which co-act with the rotor and which are located respectively on the high-pressure and the low-pressure side thereof.
Figure 4:
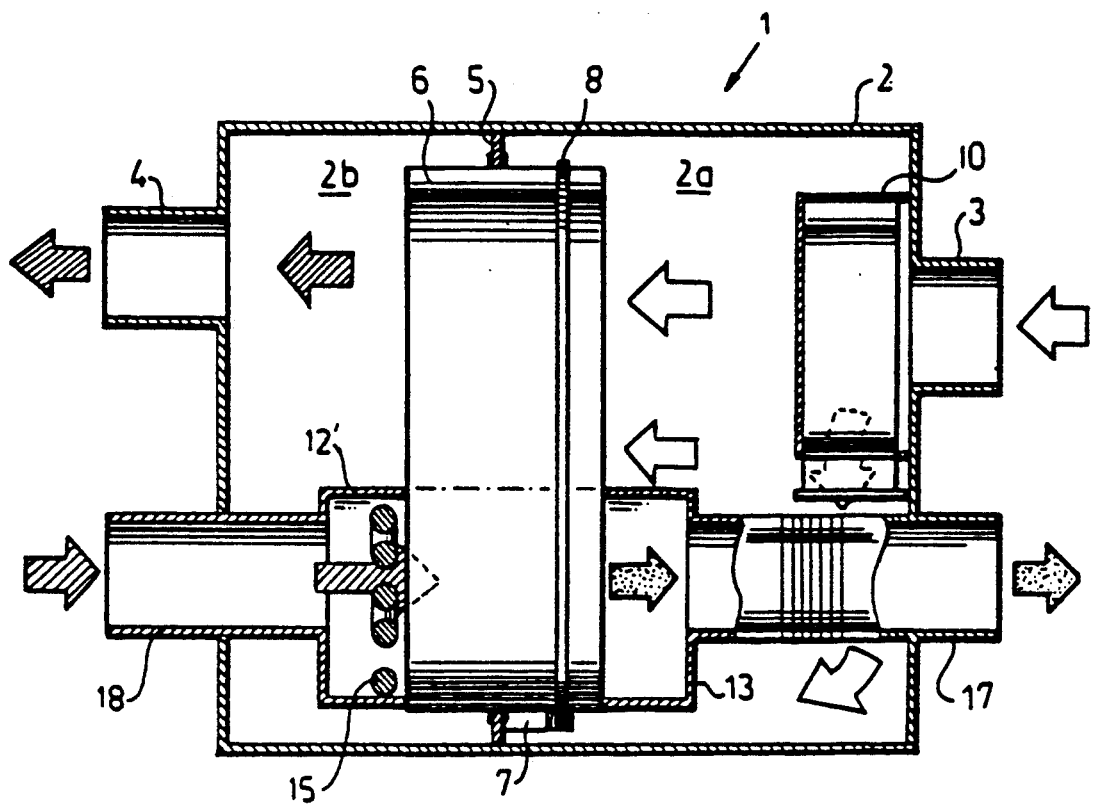
FIG. 4 is a sectional view of an embodiment alternative to the FIG. 2 embodiment.

FIG. 4 illustrates an embodiment which has been modified in relation to FIGS. 1-3, insofar none of the original flow through the rotor 6 of the modified embodiment is captured and deflected on the low-pressure side of the rotor.

In the case of the FIG. 4 embodiment, regeneration air is, instead, supplied directly through a conduit 18 connected to a modified casing 12'. The regeneration flow may optionally be preheated by means not shown, and further heated during its passage through the casing, in which heat-emitting devices in the form of electrical elements 15 are mounted and arranged in the same manner as with the afore-described embodiment, i.e. the electrical elements 15 are mounted closely adjacent the rotor 6 and are intended to deliver strong radiant heat axially onto the rotor parts located adjacent the casing 12'.

The heat-emitting devices have the same function as the heat-emitting devices described with reference to the earlier embodiment.

I claim:

1. A method of drying air with a rotating rotor mounted in a housing provided with an inlet and first and second outlets, wherein air entering via said inlet is pressurized by a fan and passed through a first part of the rotor and moisture present in the air is taken-up by moisture-sorbent means disposed in said rotor, and wherein a first portion of said air exits said housing through said first outlet and a second portion of said air is heated and passed through a second part of the rotor for regenerating said rotor part while taking-up moisture, and is discharged from the housing through said second outlet, said method comprising the step of causing the regeneration air to flow in heat transfer relationship with heat-emitting devices which are mounted adjacent the rotor on a low-pressure side thereof and which are operative to direct radiant heat axially onto the moisture-absorbent means located in the interior of the rotor, wherein the regeneration air is heated to a temperature, which together with the radiant heat emitted, will bring the rotor material adjacent said casing to a temperature above 200° C.

2. A method according to claim 1 wherein said rotor is rotated at a speed of 15-30 rev./hour.

3. A method according to claim 1, wherein the rotor material adjacent said casing is above 250° C.

4. A method according to claim 1, further comprising the step of passing the regeneration air to a casing which is located on the low-pressure side of the rotor and which accommodates the heat-emitting devices.

5. A method according to claim 4, in which a minor part of the pressurized air is captured on the low-pressure side of the rotor and, subsequent to being heated, is recycled through said second rotor-part as regeneration air, said method further comprising the step of capturing and deflecting said regeneration air by said casing prior to said air passing the heat-emitting devices.

6. A method according to claim 5, wherein said casing captures 15-35% of the dry-air volume produced, and utilizing said captured volume as regeneration air.

7. A method according to claim 6, wherein said casing captures 20% of the dry-air volume produced, and utilizing said captured volume as regeneration air.

8. An air dryer comprising:
a housing provided with an inlet and an outlet;
a rotor which is disposed in the housing such that air supplied from the inlet will flow through (at least) one part of the rotor comprising passages or a bed which contains a moisture-sorbent, wherein moisture in the air will be extracted;
means for driving the rotor;
a fan in said housing for pressurizing air supplied via the inlet, such that the air will flow through said (at least) one part of the rotor and, subsequent to said moisture-extraction, a first portion of the air will depart through the outlet;
passage means communicating with the rotor for receiving a second portion of the air comprising means for heating said second portion of the air which constitutes the regeneration air passing through a further part of the rotor; including heat-emitting devices mounted adjacent the rotor within the passage means on its low-pressure side in a casing and which are operative to deliver radiant heat axially onto the moisture-sorbent disposed in the rotor passage or bed together with the heated regeneration air and outlet means from the housing for receiving the regenerated moisture laden air.

9. An air dryer according to claim 8, wherein the rotor is mounted in a recess in a partition wall mounted in the housing and is provided with sealing means for sealing the rotor in relation to said wall; and said casing is sealed in relation to said rotor.

10. An air dryer according to claim 8, wherein said casing comprises a material which will reflect radiant heat back into the rotor.

11. An air dryer according to claims 8 or 10, wherein the first casing is approximately of circle-sector configuration with a part corresponding to the rotor shaft, and covers approximately one-fourth of the rotor surface; and a second casing is located opposite the first casing on the high-pressure side of the rotor, said second casing functioning to catch the moisture regeneration air and to conduct said air from the housing through a hose.

12. An air dryer according to claim 10, wherein said material is aluminum.

* * * * *